Jan. 20, 1970     C. PRESS     3,490,562
SPOT TYPE DISC BRAKES AND ADJUSTING MEANS THEREFOR
Filed March 16, 1967     3 Sheets-Sheet 1

United States Patent Office 3,490,562
Patented Jan. 20, 1970

3,490,562
SPOT TYPE DISC BRAKES AND ADJUSTING MEANS THEREFOR
Carl Press, Wunsiedel, Germany, assignor to The Dunlop Company Limited, London, England, a corporation of Great Britain
Filed Mar. 16, 1967, Ser. No. 623,755
Int. Cl. F16d *55/224, 65/16, 65/46*
U.S. Cl. 188—73      7 Claims

ABSTRACT OF THE DISCLOSURE

A hydraulically-operated spot-type disc brake in which the hydraulic brake-applying mechanism is axially movable as a whole relative to the brake housing and in which an adjustment device is provided between the hydraulic brake-applying mechanism and the brake housing.

---

This invention relates to spot-type disc brakes, and particularly to adjustment devices for such brakes.

Hydraulically operated disc brakes are often provided with adjustment devices which limit the return movement of the actuating piston and which are intended to ensure that the necessary movement of the pedal or lever by which the brake is operated does not change during the life of the friction pads.

It has previously been proposed to arrange the actuating piston so that its return movement is restrained by means of a friction member engaging a pin mounted in the cylinder. However, an arrangement of this kind is subject to wear and may not provide sufficient accuracy in operation, resulting in a variation in travel of the brake actuating lever or pedal.

One object of the present invention is to provide a disc brake having an improved adjustment device.

According to the invention a disc brake comprises a rotatable disc and a nonrotatable housing straddling a minor portion of a periphery of the disc, a friction element supported in the housing and axially movable therein for engagement with a braking surface of the disc, a hydraulic brake-applying mechanism supported in the housing for actuating the friction element, the hydraulic mechanism being axially movable as a whole relative to the housing and an adjustment device being provided between the hydraulic mechanism and the housing to transmit braking reaction thrust from the hydraulic mechanism to the housing.

According to the invention also a disc brake comprises a rotatable disc and a nonrotatable housing straddling a minor portion of a periphery of the disc and being axially movable relative thereto, a friction element secured against axial movement relative to one limb of the housing and a movable friction element supported in the other limb of the housing so as to be axially movable therein for engagement with a braking surface of the disc, a hydraulic brake-applying mechanism supported in the housing for moving the movable friction element towards the disc, the hydraulic mechanism being axially movable as a whole relative to the housing and an adjustment device being provided between the hydraulic mechanism and the housing to transmit braking reaction thrust from the hydraulic mechanism to the housing.

One embodiment of the invention will now be described with reference to the accompanying drawings in which.

Figure 1:
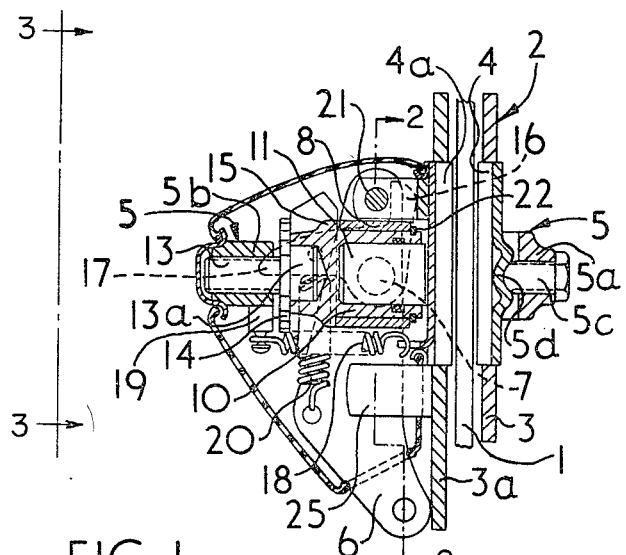
FIGURE 1 is a cross-sectional view of a disc brake in accordance with the invention.
Figure 2:
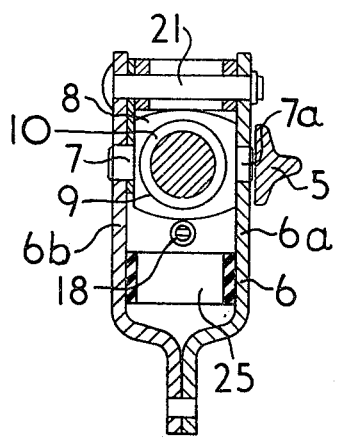
FIGURE 2 is a cross-sectional view as indicated by the line 2—2 in FIGURE 1.
Figure 3:
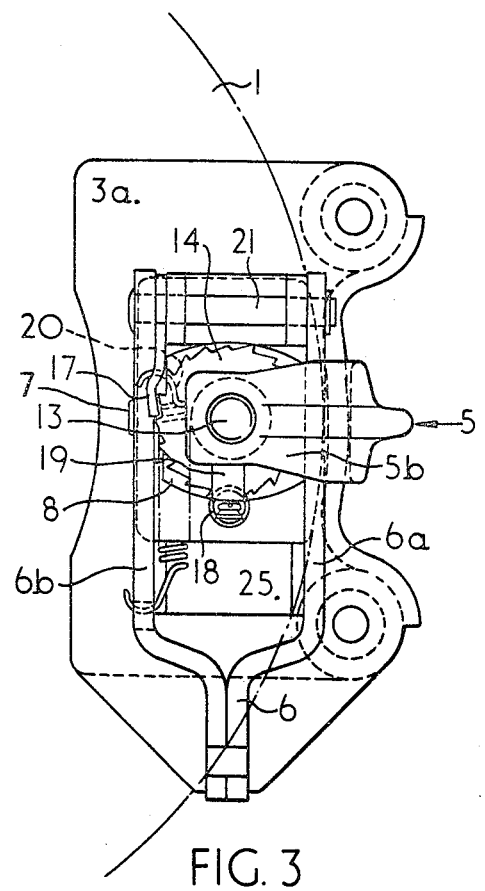
FIGURE 3 is a detail view looking in the direction of the arrows 3—3 in FIGURE 1.
Figure 4:
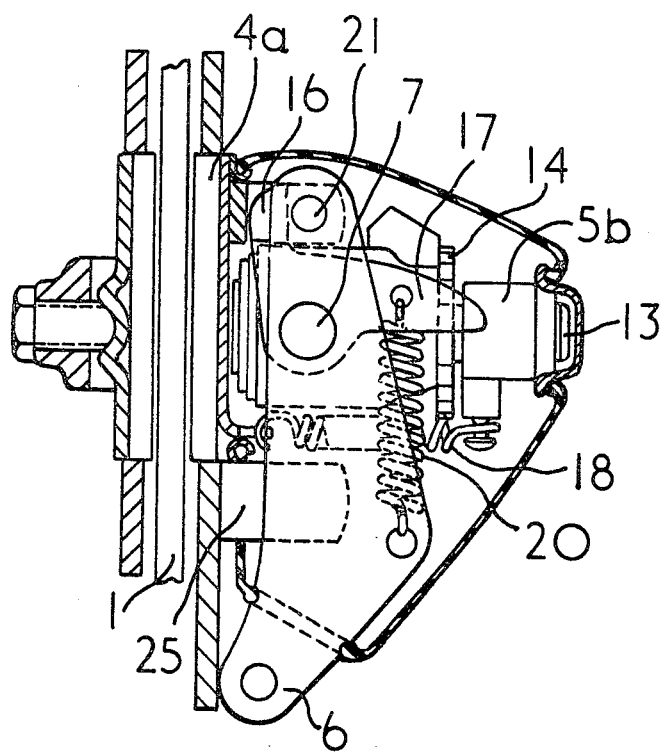
FIGURE 4 is a cross-sectional view of the disc brake in accordance with the invention.

The disc brake illustrated comprises a braking disc 1 and a nonrotatable brake carrier 2 having a pair of arms 3 and 3a formed from sheet metal and folded in a U-shape around the periphery of the brake disc 1 to provide guides for friction elements 4 and 4a. An axially movable caliper-type housing 5 is arranged so as to be freely movable in the axial direction relative to the disc 1. The friction element 4 is secured against outward axial movement relative to the limb 5a of the housing by the engagement of the rounded end of an adjustment bolt 5c, secured in the housing 5, with a socket 5d formed on the metal backing plate of the friction element. Operation of the brake is effected by means of a mechanical actuating lever 6 or by the operation of a hydraulic cylinder 10 and piston 11 which can be operated to urge the friction element 4a towards its corresponding side of the disc and to cause a corresponding reaction force on the housing 5 acting in the opposite direction. The reaction force on the housing 5 is then transmitted through the limb 5a of the housing to the friction element 4 to press the friction element 4 against the disc.

The lever 6 is pivotally mounted on the friction element 4a by means of a pin 21 and is of bifurcated form comprising a pair of paraller side members 6a and 6b. The lever 6 is pivotally attached by means of studs 7 and 7a to a crosshead 8 which contains the wheel brake cylinder 10 within its bore 9, the cylinder being retained in a fixed axial position relative to the crosshead by means of a shoulder 15 formed on the cylinder at one end and a locking ring 22 located in a recess in the outer wall of the cylinder, adjacent the open end of the cylinder.

The arrangement of the hydraulic brake-applying mechanism 10, 11 and the mechanical brake operating lever 6 is such that the brake can be operated either by hydraulic pressure fed to the cylinder 10 or mechanically, by turning the lever 6 in a clockwise direction as seen in FIGURE 1, about its pivotal connection to the studs 7, 7a. The lever 6 exerts pressure on the pin 21 which is connected to the friction element 4a and which transmits a thrust to force the friction element 4a against the disc. During mechanical actuation of the brake the piston 11 is supported against the end of the cylinder 10. A common adjustment mechanism is provided for both the hydraulic mechanism and the mechanical actuating mechanism, and this will now be described.

The end of the cylinder remote from the disc is recessed to receive and rotatably support the head 13a of an adjustment screw 13 which is in screw-threaded engagement with a screw-threaded bore in the limb 5b of the housing 5. The adjustment screw 13 is formed with a collar 14 provided with ratchet teeth around its periphery, the collar 14 engaging the axially outer end of the cylinder 10 to transmit the reaction thrust from the brake applying mechanism 10, 11 to the housing 5.

The stud 7 of the crosshead forms a pivot for an adjustment lever in the form of a bellcrank having arms 16 and 17. The arm 17 is urged by means of an adjustment spring 20 to engage the ratchet teeth of the collar 14 so as to tend to rotate the adjustment screw in a direction which will move the collar 14 towards the disc. The other arm 16 is arranged so that when the brake is applied and the friction element 4a is moved towards the disc the pin 21 forms an abutment which engages the end of the arm 16 causing the adjustment lever to pivot in a clockwise direction as seen in FIGURE 1. As wear on the friction pad increases, the movement of the adjustment lever in each application of the brake will also increase until the arm 17 rides over a ratchet tooth on the collar 14. Subsequently when the brake is released the adjustment spring 20 will pull the arm 17 of the adjustment lever so as to rotate the adjustment screw 13 through an angle corresponding to one ratchet tooth and will thus move the head 13a of the adjustment screw 13 axially towards the disc by a proportionate amount.

A return spring 18 is provided to retract the friction element 4a after each brake application, the return spring 18 being attached at one end to the friction element and at the other end to a portion 19 of the housing 5, and is arranged to operate so as to restore the crosshead and the hydraulic mechanism after each braking application to the condition shown in FIGURE 1, in which the piston 11 is fully retracted in the cylinder 10, any excessive clearance having been taken up by movement of the adjustment screw 13. The mechanical operating means for the brake and the hydraulic brake operating means are therefore movable as a whole and are both adjusted simultaneously by rotation of the adjustment screw 13, and the arrangement is such that the piston travel during each brake application is substantially unaltered throughout the wear life of the friction elements.

In order to prevent chattering of the brake due to resonant vibrations the actuating lever 6 is guided by a U-shaped bridge member 25 made of an elastic material and fixed to the arm 3a of the brake carrier.

Although the present invention has been illustrated and described in connection with the single example embodiment, it will be understood that this is illustrative of the invention and is by no means restrictive thereof. It is reasonably to be expected that those skilled in the art can make numerous revisions and adaptations of the invention, and it is intended that such revisions and adaptations will be included within the scope of the present invention.

Having now described my invention, what I claim is:

1. A disc brake comprising a rotatable disc and a non-rotatable housing straddling a minor portion of a periphery of the disc and being axially movable relative thereto, a friction element secured against axial movement relative to one limb of the housing and a movable friction element supported in the other limb of the housing so as to be axially movable therein for engagement with a braking surface of the disc, a piston-and-cylinder brake-applying mechanism supported in the housing for moving the movable friction element towards the disc, the said brake-applying mechanism being axially movable as a whole relative to the housing and an adjustment device being provided between the brake-applying mechanism and the housing to transmit braking reaction thrust from the brake-applying mechanism to the housing, and wherein the adjustment device comprises an adjustment screw in screw-threaded engagement with the housing and having a head in engagement with the said applying mechanism, the screw including a ratchet engageable by an adjustment lever associated with the said applying mechanism and the movable friction element, and wherein the adjustment device comprises an adjustment lever pivotally mounted on the said applying mechanism and having one arm engageable with the ratchet and another arm engageable by an abutment associated with the movable friction element, an adjustment spring being arranged to urge the adjustment lever to rotate the ratchet so as to take up brake clearances.

2. A disc brake according to claim 1 wherein a retraction spring is connected at one end to the housing and at the other end to the movable friction element.

3. A disc brake according to claim 1 wherein the friction element secured to the housing is provided with a backing plate formed with a cup-shaped depression for engagement with a spherical end of an adjustment screw received in a screw-threaded bore of the housing.

4. A disc brake according to claim 1 wherein the housing is associated with a brake carrier of sheet metal folded in U-shaped form around the periphery of the disc and having apertures in which the friction elements are guided.

5. A disc brake according to claim 4 including an actuating lever and in which a guide for the actuating lever comprises a U-shaped member formed from elastic material and fixed to the brake carrier.

6. A disc brake according to claim 1 including an actuating lever which is of bifurcated form comprising a pair of parallel side members and is pivoted at one end to the movable friction element, the said applying mechanism being disposed between the two side members of the lever and being pivotally attached thereto by means of a crosshead pivotally secured to the lever, the cylinder of the said applying mechanism being located within an axial bore of the crosshead.

7. A disc brake according to claim 6 wherein the head of the cylinder of said applying mechanism is recessed to receive and rotatably support the head of the adjustment screw, the cylinder having a shoulder adjacent its head which engages one end of the crosshead, the other end of the cylinder having a groove in which a detachable locking ring is secured, the locking ring being engageable with the other end of the crosshead to transmit brake-applying thrust from the actuating lever to the cylinder, and the cylinder including a piston arranged to abut the cylinder head when the brake is applied by the mechanically-actuated mechanism.

References Cited

UNITED STATES PATENTS

| 2,731,112 | 1/1956 | Berrows | 188—73 |
| 2,804,176 | 8/1957 | Trevaskis | 188—73 |
| 3,047,098 | 7/1962 | Olley | 188—216 X |
| 3,194,351 | 7/1965 | Swift | 188—73 |
| 3,199,635 | 8/1965 | Bessler et al. | 188—73 |
| 3,266,602 | 8/1966 | Belart et al. | 188—73 |
| 3,279,564 | 10/1966 | Gancel | 188—73 |
| 3,321,050 | 5/1967 | Press. | |
| 3,269,491 | 8/1966 | Belart et al. | |
| 3,403,761 | 10/1968 | Rockwell. | |

FOREIGN PATENTS 1,428,725  1/1966  France.

GEORGE E. A. HALVOSA, Primary Examiner

U.S. Cl. X.R.

188—106, 196